United States Patent
Krieg

(10) Patent No.: US 11,858,732 B2
(45) Date of Patent: Jan. 2, 2024

(54) SECURE DESKTOP ITEM RECEPTACLE

(71) Applicant: Philip Krieg, Phoenixville, PA (US)

(72) Inventor: Philip Krieg, Phoenixville, PA (US)

(*) Notice: Subject to any disclaimer, the term of this patent is extended or adjusted under 35 U.S.C. 154(b) by 0 days.

(21) Appl. No.: 17/090,875

(22) Filed: Nov. 5, 2020

(65) Prior Publication Data

US 2021/0229904 A1   Jul. 29, 2021

Related U.S. Application Data

(60) Provisional application No. 62/965,771, filed on Jan. 24, 2020.

(51) Int. Cl.
*B65F 1/02*   (2006.01)
*B65F 1/14*   (2006.01)

(52) U.S. Cl.
CPC ........ *B65F 1/141* (2013.01); *B65F 2250/107* (2013.01); *B65F 2250/11* (2013.01); *B65F 2250/114* (2013.01); *B65F 2250/12* (2013.01)

(58) Field of Classification Search
CPC .. B65F 1/14; B65F 2250/107; B65F 2250/11; B65F 2250/114; B65F 2250/12; A47J 47/08; B65D 47/0823; B65D 2313/06; A47G 19/10; A47G 19/2261; A47G 23/0225
USPC .............. 220/483, 475, 229, 731, 810, 200; 248/362, 205.5, 683; 426/115, 106
See application file for complete search history.

(56) References Cited

U.S. PATENT DOCUMENTS

| 2,083,299 | A | * | 6/1937 | Hunter | A47G 29/093 |
| | | | | | 248/500 |
| D429,121 | S | | 8/2000 | Hasz | |
| 6,656,514 | B1 | * | 12/2003 | Tubbs | A47J 47/08 |
| | | | | | 220/229 |
| 8,302,798 | B2 | * | 11/2012 | Moss | B65D 47/06 |
| | | | | | 220/229 |
| 9,259,072 | B2 | | 2/2016 | Friedman | |
| 9,585,455 | B2 | * | 3/2017 | Boyle | A44C 9/0084 |
| 2014/0326630 | A1 | * | 11/2014 | Henry | A47G 19/02 |
| | | | | | 206/503 |
| 2019/0024699 | A1 | * | 1/2019 | Mutch | F16B 47/00 |

FOREIGN PATENT DOCUMENTS

EP   3622857   3/2020

* cited by examiner

Primary Examiner — John K Fristoe, Jr.
Assistant Examiner — Elizabeth J Volz
(74) Attorney, Agent, or Firm — Sanford J. Piltch

(57) ABSTRACT

An article of manufacture for providing a secure desktop item receptacle includes a hollow container, an attaching base coupled to a bottom surface of the hollow container for attaching the container to a desktop, and a star shaped opening through a top surface of the hollow container providing access to the inside volume of the container. The attaching base includes a suction cup attachment device on a bottom surface of the attaching base, and a support pedestal between the suction cup attachment device and the hollow container. The hollow container has a spherical shape, a goblet shape and an octagon shape. The container may be made of rubber, silicone, plastic, metal and glass and mixtures thereof.

6 Claims, 6 Drawing Sheets

SECURE DESKTOP ITEM RECEPTACLE

CROSS-REFERENCE TO RELATED APPLICATION

This application claims priority to U.S. Provisional Patent Application No. 62/965,771, titled "Secured Storage Device," and filed on Jan. 24, 2020. The entire application is incorporated herein by reference in its entirety.

TECHNICAL FIELD

This application relates in general to an article of manufacture for providing a secure desktop item receptacle.

BACKGROUND

Office workers and other individuals interact with and create material which involves printed items that are consumed by others. Additionally, many hobby crafters often find themselves picking up small scraps of sticky vinyl with a small hook similar to a dental pick. These printed items are typically a mix of graphics and text and may also include other physical objects. These small sticky pieces of waste vinyl are often troublesome, as there is no quick convenient way to remove them from the end of the crafting hook. Typically, crafters will have to remove the sticky vinyl with their fingers, leaving waste vinyl all over the crafting area, something that is rather bothersome to clean up. Sometime crafters will have a small trashcan on their desk, this is inconvenient because it take up a lot of valuable desk space, slides around, and is annoying to reach over and use.

While the workers are creating their documents, their desktops may become cluttered with items that are removed from the work in progress or excess material that may be added to the physical renderings of these documents while the documents are being created. This clutter can get in the way of a worker efficiently creating these documents, especially when the documents are complex and require creativity to visualize their creation.

The present invention attempts to address the existing limitations in providing a secure desktop item receptacle according to the principles and example embodiments disclosed herein. A receptacle that securely attaches to a desktop that contains a usefully shaped opening may provide workers with a means to reduce desk/work area clutter and provide the worker with a place to store the waste while the documents are being created. This process is especially useful for graphic artists who work with physical renditions of items requiring layers of textured material, rather than digital representations of these objects.

SUMMARY

In accordance with the present invention, the above and other problems are solved by providing an article of manufacture for a secure desktop item receptacle.

In one aspect of the present disclosure, the desktop storage container is made of a hollow container, an attaching base coupled to a bottom surface of the hollow container for attaching the container to a desktop, and a four point star shaped opening through a top surface of the hollow container providing access to the inside volume of the hollow container.

In another aspect of the present disclosure, the attaching base includes a suction cup attachment device on a bottom surface of the attaching base, and a support pedestal coupled between the suction couple attachment device and the hollow container.

In yet another aspect of the present disclosure, the hollow container has a spherical shape, a tall goblet shape, and a tall octagon shape.

In another aspect of the present disclosure the four point star opening has a cross shape, a narrow arm shape, and a diamond shape. The container may be made of is made of rubber, silicone, plastic, metal and glass.

In yet another embodiment, the present invention seeks to provide an ergonomic solution to this problem by providing a simple hands free effective way to quickly remove sticky vinyl from the end of the crafting hook, while securely storing it in a convenient location for later disposal by the user. The invention will consist of a hallowed object, which is connected to a suction cup which will stick to any flat surface. The hallowed part of the object will have an opening at the top. The top of the secured storage device will have an opening which will connect to at least one fold-able flap. A hook with a piece of vinyl stuck to it can travel into the opening past the flaps into the body cavity of the invention. The scrap of vinyl or other objects will be caught and filtered off of a crafting hook by the flaps on the opening, while the hook passes through the slits between the flaps of the device. The vinyl or and other object will then be contained and stored in cavity of body of the device. The body of the secured storage device will be connected to a suction cup, which will suction the device to a table or desk, as to keep both hands free while in use, and to ensure the secured containment device will remain stationary and upright so all intended objects will remain inside the device. Preferably, the product will be a sphere with a cute diamond shaped opening at the top, which will allow for optimal product. The top body piece will be connected to the suction cup which will secure the product to whichever surface it is resting on.

The great utility of the invention is that the article of manufacture provides a secure desktop item receptacle.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
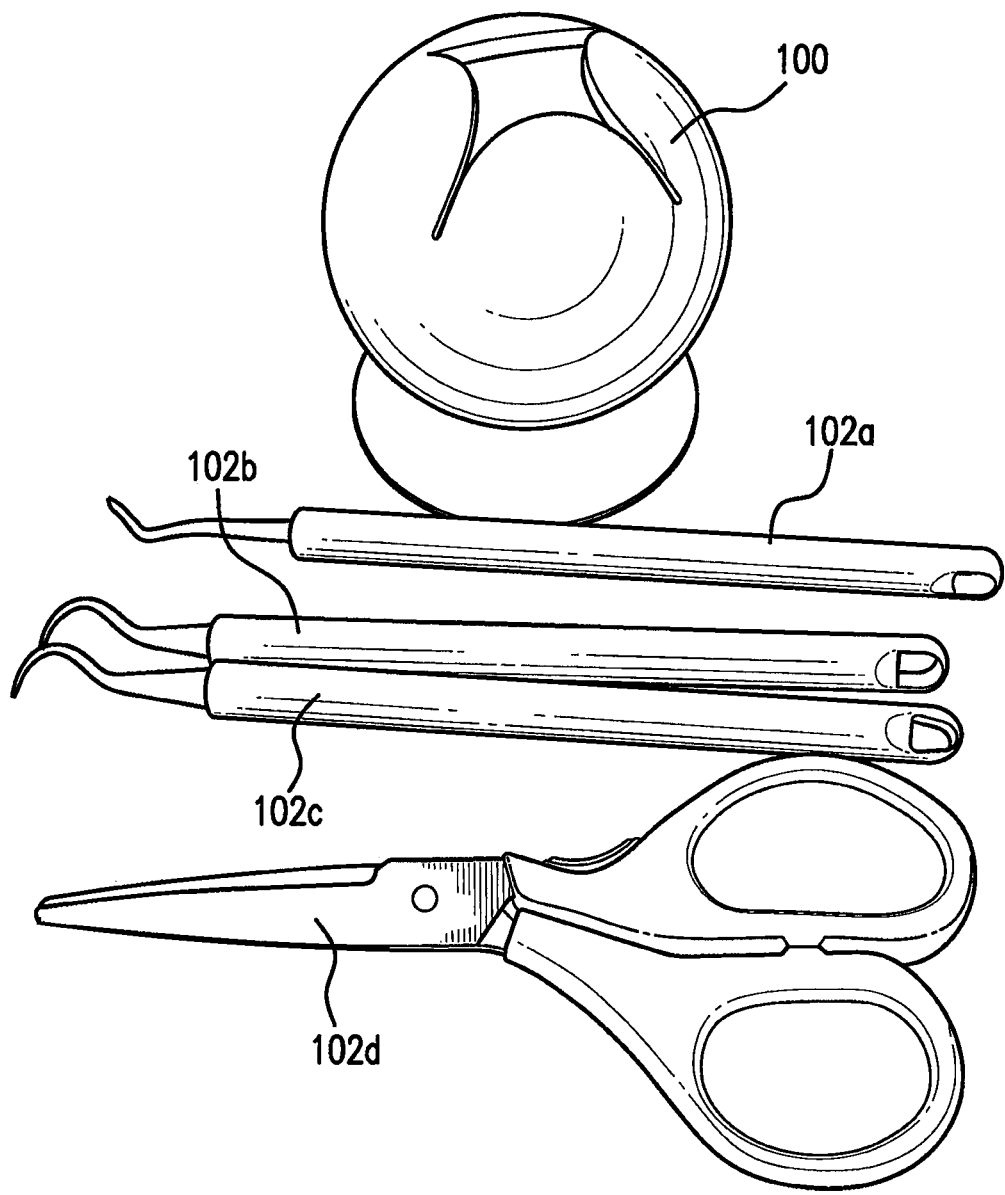
FIG. 1 illustrates a first potential embodiment of an article of manufacture for providing a secure desktop item receptacle according to the present invention.

This application relates in general to an article of manufacture for providing a secure desktop item receptacle according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill. Further, unless otherwise stated, the term "about" shall expressly include "exactly."

The term "user" and "worker" refers to an entity, e.g. a human, that utilizes a device according to the present invention in order to bring about a desired effect or outcome. In a particular case, the user is one who places material into the receptacle. For such a user, the terms "user" and "worker" may be used herein interchangeably.

The term "invention" or "present invention" refers to the invention being applied for via the patent application with the title "Funky Desk Ball." Invention may be used interchangeably with ball receptacle.

In general, the present disclosure relates to an article of manufacture for providing a secure desktop item receptacle according to the present invention. To better understand the present invention, FIG. 1 illustrates a first potential embodiment of an article of manufacture for providing a secure desktop item receptacle according to the present invention. A secure desktop item receptacle 100 is shown on a desktop with a set of tools 102a-d that are useful when a graphic artist works with physical renditions of items that require layers of textured material rather working with digital representations of these objects. These tools 102a-d permit the worker to add, cut, and remove layers of textured material from the document or similar object being created. These tools 102a-d may include various pick and cutting tools, including scissors 102d for working with layers of textured material.

The secure desktop item receptacle 100 provides a storage location for the textured items that are waste from the creation of the object. Additional details regarding the secure desktop item receptacle 100 are described below in reference to FIGS. 2-6.

Figure 2:
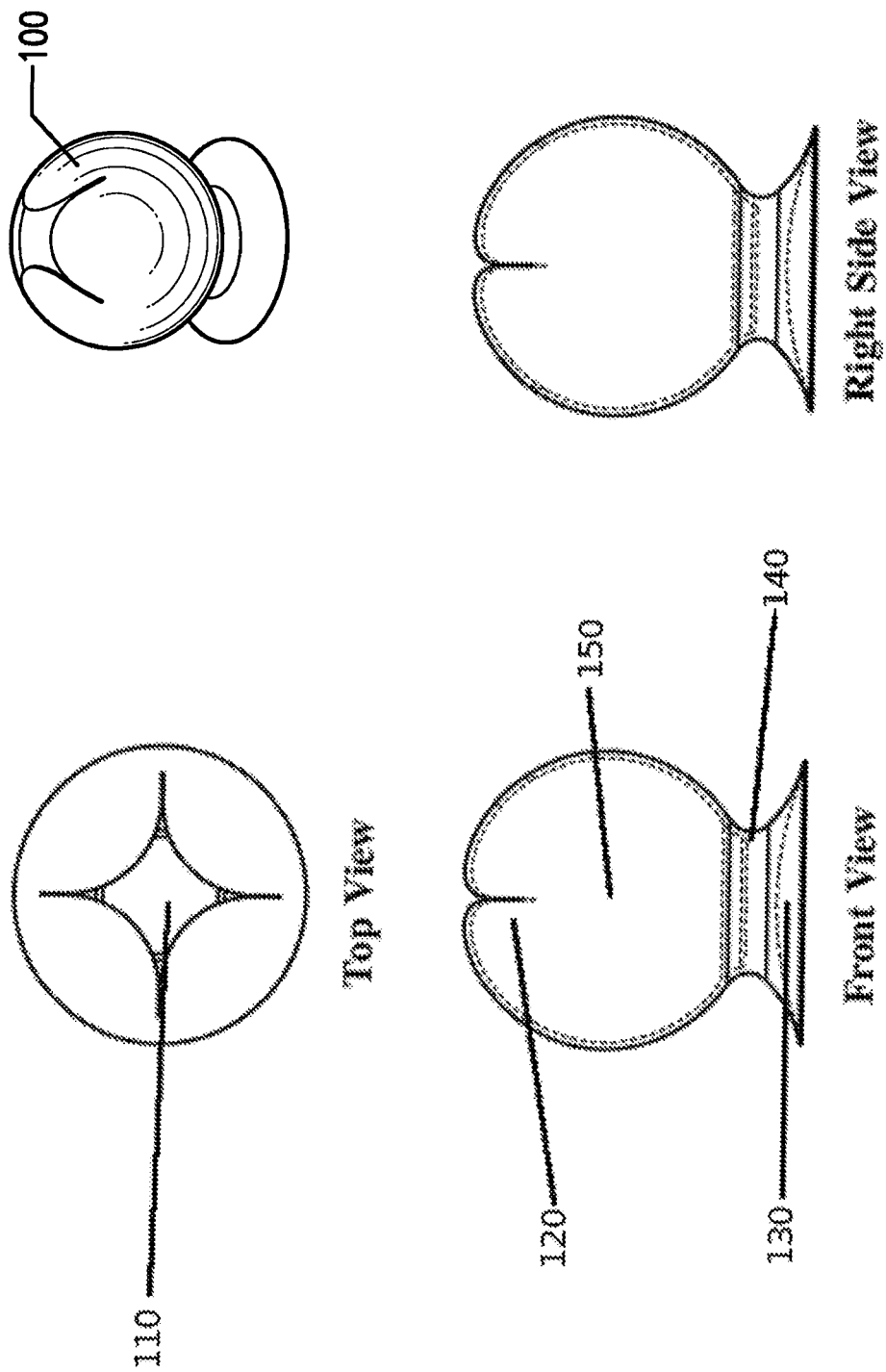
FIG. 2 illustrates a set of directional views of an example embodiment of an article of manufacture for providing a secure desktop item receptacle according to the present invention.

FIG. 2 illustrates a set of directional views of an example embodiment of an article of manufacture for providing a secure desktop item receptacle according to the present invention. Top, front, side and perspective views of the first embodiment for the secure desktop item receptacle 100 are shown in FIG. 2. The secure desktop item receptacle 100 includes a hollow container, and in this embodiment a hollow receptacle sphere 150, on top of an attaching base 140 that is coupled to a suction cup attachment device 130. The hollow receptacle sphere 150 defines the inside volume of the hollow container. The attaching base 140 provides separation between the hollow receptacle sphere 150 and the desktop. The suction cup attachment device 130 may be used to secure the desktop item receptacle 100 to a user's desktop.

The secure desktop item receptacle 100 also includes an opening 110 along its top surface of the hollow receptacle sphere 150 providing access to the inside volume of the hollow container. In the embodiment of FIG. 2, the opening is shaped like a four-pointed star. The opening 110 covers a significant portion of the top surface of the hollow receptacle sphere 150 that retains waste material from a user. The opening 110 has a set of curved shaped edges that permits the user to insert the waste material from the textured material being used in the creation of objects. The user may pick up the waste material using one of the tools 102a-d (shown in FIG. 1) and place it into the secure desktop item receptacle 100 and use these edges to deposit the material within the receptacle.

Figure 3:
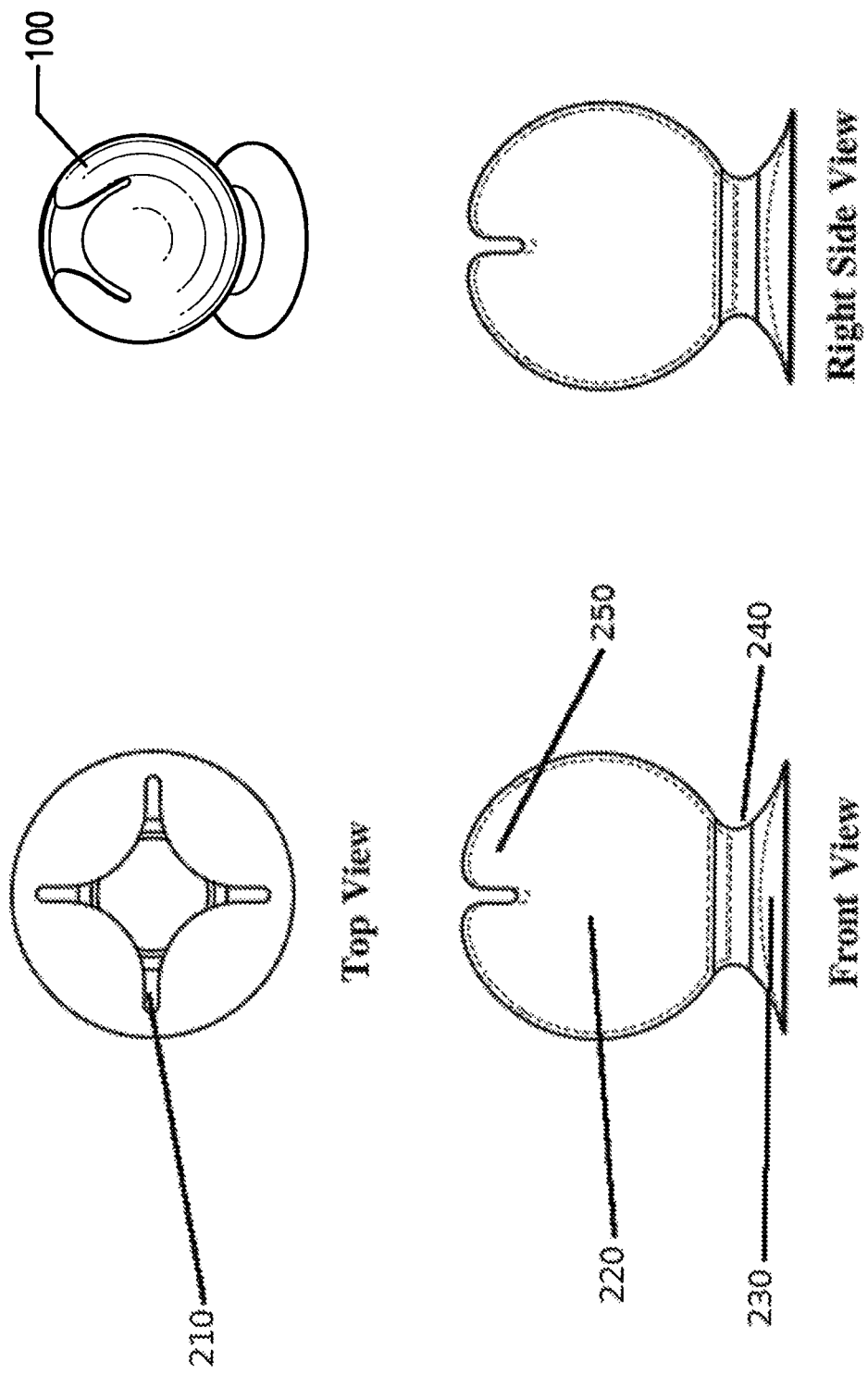
FIG. 3 illustrates a set of directional views of a second embodiment of an article of manufacture for providing a secure desktop item receptacle according to the present invention.

FIG. 3 illustrates a set of directional views of a second embodiment of an article of manufacture for providing a secure desktop item receptacle according to the present invention. Top, front, side and perspective views of the second embodiment for the secure desktop item receptacle 200 are shown in FIG. 3. The secure desktop item receptacle 200 includes a hollow container, in this embodiment a hollow receptacle sphere 220, on top of an attaching base 240 that is coupled to a suction cup attachment device 230. The hollow receptacle sphere defines the inside volume of the hollow container. The attaching base 240 provides separation between the hollow receptacle sphere 220 and the desktop. The suction cup attachment device 230 may be used to secure the desktop item receptacle 200 to a user's desktop.

The secure desktop item receptacle 200 also includes an opening 250 along its top surface that is shaped like a four-pointed star. The opening 250 covers a significant portion of the top surface of the hollow receptacle sphere 220 creating a receptacle for retaining waste material from a user. The opening 250 has a set of curved shaped edges that permits the user to insert the waste material from the textured material being used in the creation of objects. The user may pick up the waste material using one of the tools 102a-d (shown in FIG. 1) and place it into the secure desktop item receptacle 200 and use these edges to deposit the material within the receptacle. The opening 210 is similar to the opening 120 of FIG. 3 except that the opening 210 provides a wider set of slit openings as the star reaches each of its points.

Figure 4:
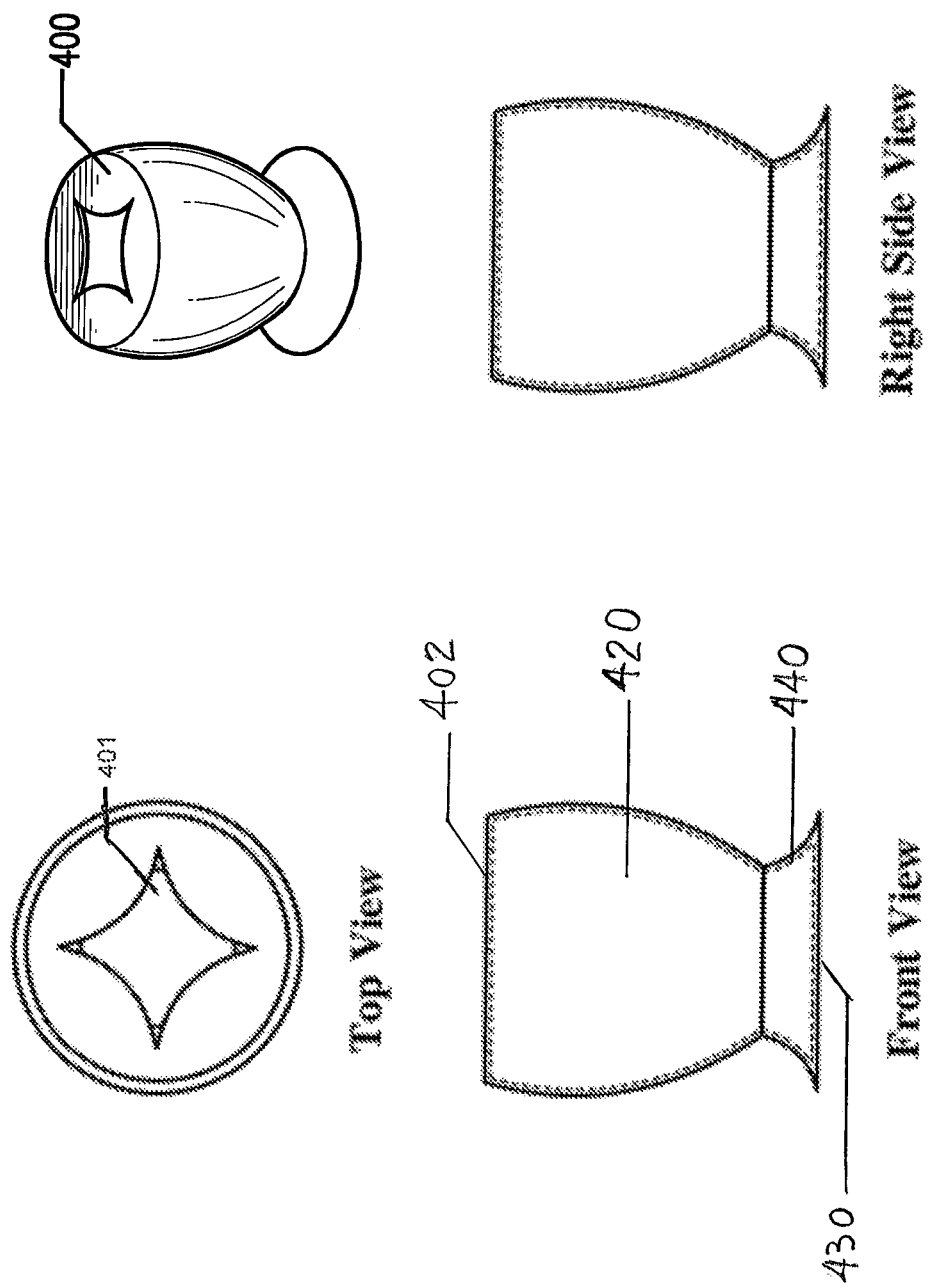
FIG. 4 illustrates a set of directional views of a third example embodiment of an article of manufacture for providing a secure desktop item receptacle according to the present invention.

FIG. 4 illustrates a set of directional views of a third example embodiment of an article of manufacture for providing a secure desktop item receptacle according to the present invention. Top, front, side and perspective views of the third embodiment for the secure desktop item receptacle 400 are shown in FIG. 4. The secure desktop item receptacle 400 includes a hollow container, in this embodiment a hollow goblet-shaped enclosure 420, on top of an attaching base 440 that is coupled to a suction cup attachment device 430. The hollow goblet-shaped enclosure 420 defines the inside volume of the hollow container. The attaching base 440 provides separation between the hollow goblet-shaped enclosure 420 and the desktop. The suction cup attachment device 430 may be used to secure the desktop item receptacle 400 to a user's desktop.

The secure desktop receptacle 400 also includes an opening 401 along its flat top surface 402 that is shaped like a four-pointed star. The opening 401 covers a significant portion of the top surface of the hollow goblet-shaped enclosure 420 creating a receptacle for retaining waste material from a user. The opening 401 has a set of curved shaped edges that permits the user to insert the waste material from the textured material being used in the creation of objects. The user may pick up the waste material using one of the tools 102a-d (shown in FIG. 1) and place it into the secure desktop item receptacle 400 and use these edges to deposit the material within the receptacle. The hollow goblet-shaped enclosure has the flat top surface 402 and opening 401 that is similar to the opening 110 within the hollow receptacle sphere 150 in FIG. 2 except for the shape of the enclosure itself.

Figure 5:
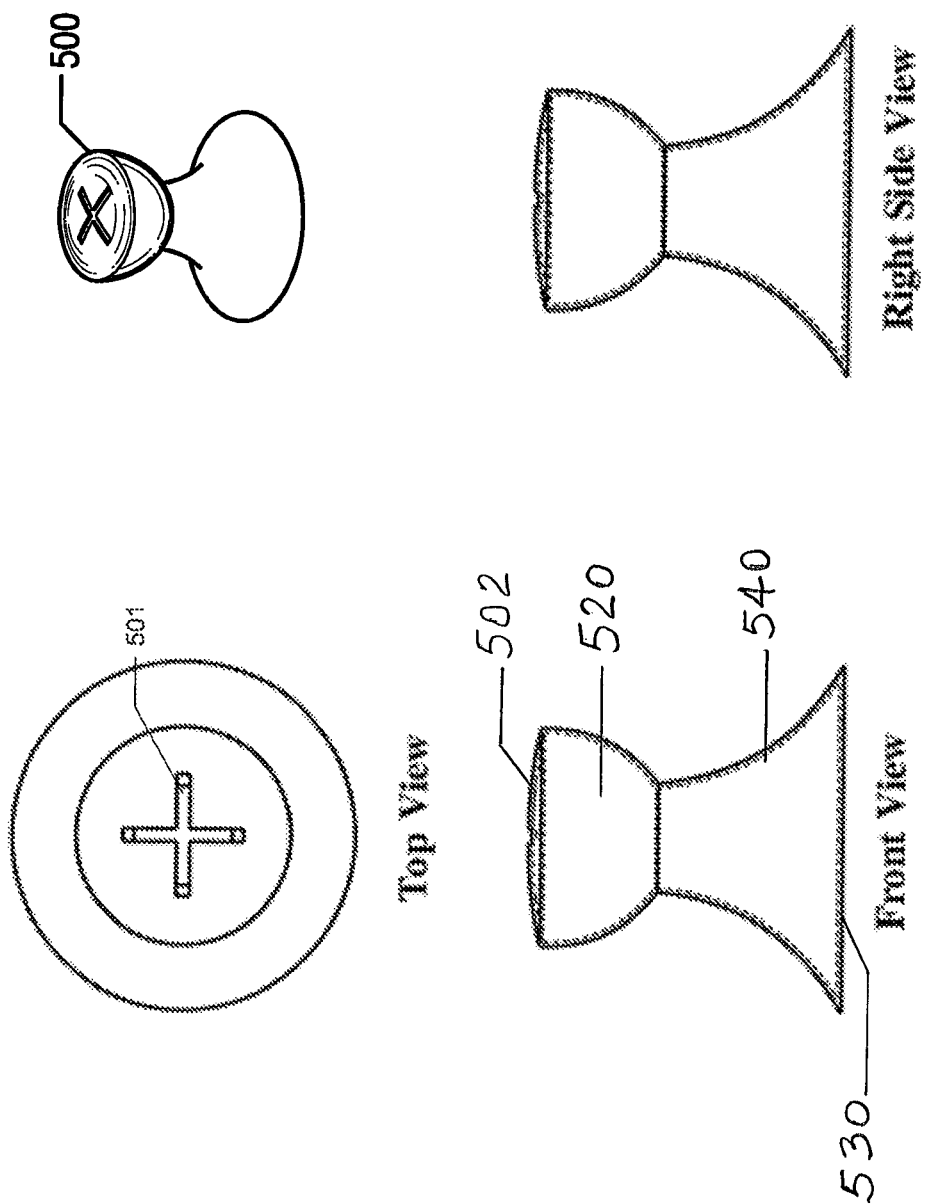
FIG. 5 illustrates a set of directional views of a fourth example embodiment of an article of manufacture for providing a secure desktop item receptacle according to the present invention.

FIG. 5 illustrates a set of directional views of a fourth example embodiment of an article of manufacture for providing a secure desktop item receptacle according to the present invention. Top, front, side and perspective views of the fourth embodiment for the secure desktop item receptacle 500 are shown in FIG. 5. The secure desktop item receptacle 500 includes a hollow container, in this embodiment a hollow-goblet-shaped enclosure 520, on top of a support pedestal 540 that is coupled to a suction cup attachment device 530. The support pedestal 540 raises the hollow goblet-shaped enclosure up above the tabletop and provides separation between the goblet-shaped enclosure 520 and the suction cup attachment device 530. The hollow goblet-shaped enclosure 520 defines the inside volume of the hollow container. The suction cup attachment device 530 may be used to secure the secure desktop item receptacle 500 to a user's desktop.

The secure desktop item receptacle 500 also includes an opening 501 along its flat top surface 502 that is shaped like a four-pointed star. The opening 501 covers a significant portion of the top surface of the hollow goblet-shaped enclosure 520 creating a receptacle for retaining waste material from a user. The opening 501 has a set of curved shaped edges that permits the user to insert the waste material from the textured material being used in creatin of objects. The user may pick up waste material using one of the tools 102a-d (shown in FIG. 1) and place it into the secure desktop item receptacle 500 and use these edges to deposit the material within the receptacle. The hollow goblet-shaped enclosure 520 has the flat top surface 502 and opening 501 that is similar to the opening 110 within the hollow sphere 150 in FIG. 2 except for the shape of the enclosure itself.

Figure 6:
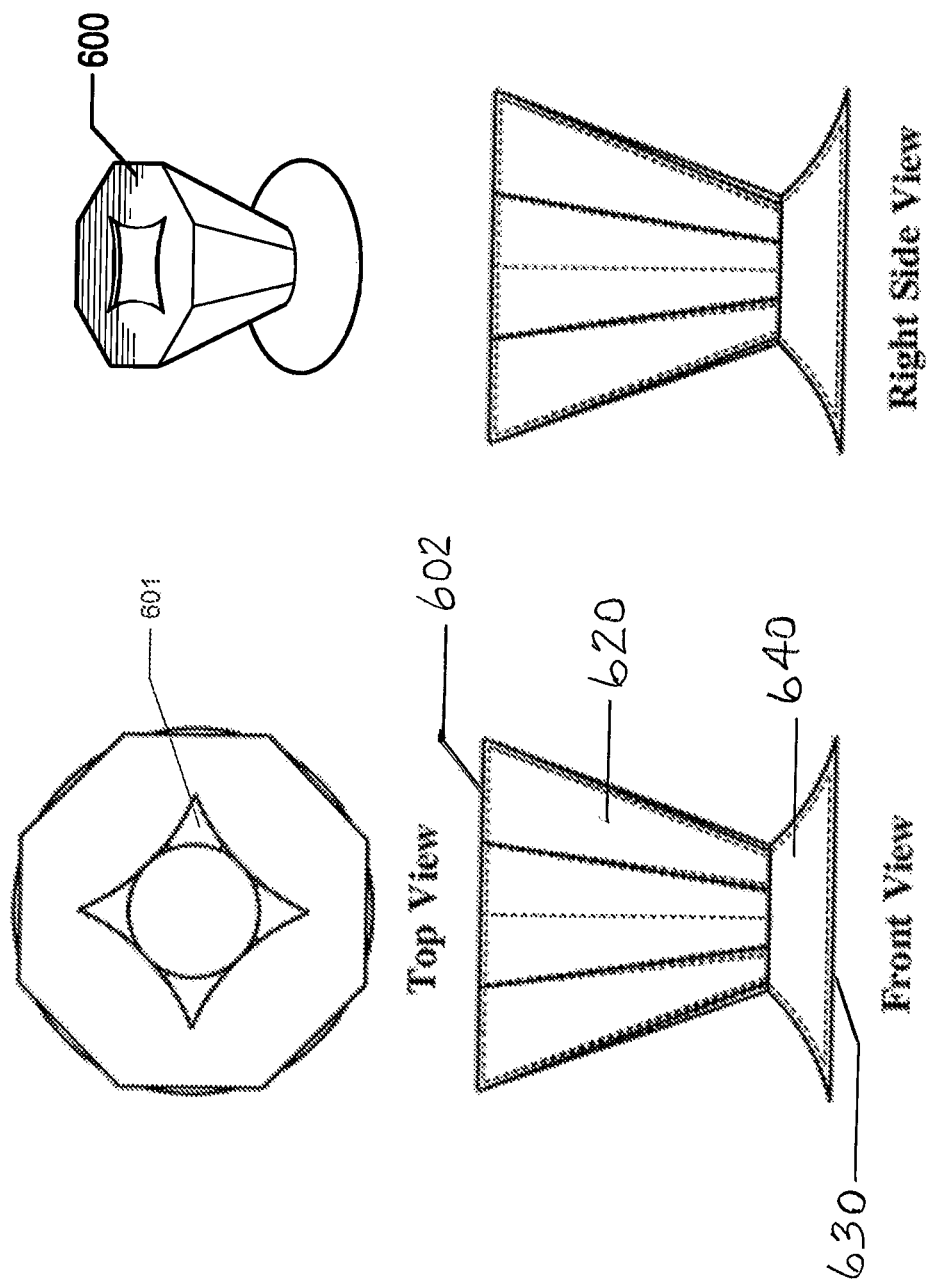
FIG. 6 illustrates a set of directional views of a fifth example embodiment of an article of manufacture for providing a secure desktop item receptacle according to the present invention.

FIG. 6 illustrates a set of directional views of a fifth example embodiment of an article of manufacture for providing a secure desktop item receptacle according to the present invention. Top, front, side and perspective views of the fifth embodiment for the secure desktop item receptacle 600 are shown in FIG. 6. The secure desktop item receptacle 600 includes a hollow container, in this embodiment a hollow octagon-shaped enclosure 620, on top of an attaching base 640 that is coupled to a suction cup attachment device 630. The attaching base 640 provides separation between the hollow octagon-shaped enclosure 630 and the desktop. The hollow octagon-shaped enclosure 620 defines the inside volume of the hollow container. The suction cup attachment device 630 may be used to secure the desktop item receptacle 600 to a user's desktop.

The secure desktop item receptacle 600 also includes an opening 601 along its flat top surface 602 that is shaped like a four pointed star. The opening 601 covers a significant portion of the top surface of the hollow octagon-shaped enclosure 620 creating a receptacle for retaining waste material from a user. The opening 601 has a set of curved shaped edges that permits the user to insert the waste material from the textured material being used in the creation of objects. The user may pick up the waste material using one of the tools 102a-d (shown in FIG. 1) and place it into the secure desktop item receptacle 600 and use these edges to deposit the material within the receptacle. The hollow octagon-shaped enclosure 620 has the flat top surface 602 and opening 601 that is similar to the opening 110 within the hollow receptacle sphere 150 in FIG. 2 except for the shape of the enclosure itself and that the opening 601 provides a wider set of slit openings as the star reaches each of its points.

It will be further understood that various changes in the details, materials, and arrangements of the parts which have been described and illustrated in order to explain embodiments of this invention may be made by those skilled in the art without departing from embodiments of the invention encompassed by the following claims.

In this specification, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. A waste receptacle comprising:
    a body defining a wall, the wall enclosing an interior volume and providing a central upward opening aperture communicating through the wall to the interior volume, the wall having a plurality of curvilinear slots disposed about an upward facing surface such that each slot communicates through the wall to the interior volume and intersects the central aperture;
    a plurality of leaves defined by the wall in cooperation with the central aperture and the plurality of slots, each of the leaves being disposed radially outward about the central aperture with each leaf being immediately adjacent to another leaf separated by a corresponding slot, each of said slots having an acute angle therebetween oriented toward the central aperture;
    a base attached to a bottom surface of the waste receptacle for supporting the body and providing an attaching point for the waste receptacle to a surface; and
    a suction device attached to the base, the suction device being configured to releasably secure the body to a surface,
wherein the central aperture defines a centrally located upward opening approximating a circle, the central opening having a predetermined circumference with a like number of points on the circumference of the central opening being tangent to each of the plurality of leaves, the diameter of the central opening being greater than the width of each of the plurality of slots.

2. The waste receptacle according to claim 1 wherein the central aperture and the plurality of slots provide exclusive communication through the wall to the interior volume.

3. The waste receptacle according to claim 1 wherein the body may be spherical, cup-shaped or geometric in shape.

4. The waste receptacle according to claim 1 wherein the plurality of slots are disposed symmetrically about the central opening.

5. The waste receptacle according to claim 1 wherein the plurality of slots are disposed asymmetrically about the central opening.

6. The waste receptacle according to claim 1, wherein the receptacle is made of a material selected from the group consisting of rubber, silicone, plastic, metal and glass and mixtures thereof.

* * * * *